United States Patent [19]
Sinha et al.

[11] Patent Number: 6,111,340
[45] Date of Patent: Aug. 29, 2000

[54] DUAL-MODE THICKNESS-SHEAR QUARTZ PRESSURE SENSORS FOR HIGH PRESSURE AND HIGH TEMPERATURE APPLICATIONS

[75] Inventors: Bikash K. Sinha, West Redding, Conn.; Masaru Niwa, Kawasaki, Japan; Noriyuki Matsumoto, Yokohama, Japan; Yukio Sudo, Machida, Japan

[73] Assignee: Schlumberger Technology Corporation, Ridgefield, Conn.

[21] Appl. No.: 09/290,316

[22] Filed: Apr. 12, 1999

[51] Int. Cl.$^7$ .................................................. H01L 41/08
[52] U.S. Cl. ........................... 310/361; 310/348; 310/371
[58] Field of Search .................................. 310/348, 349, 310/368, 361, 371

[56] References Cited

U.S. PATENT DOCUMENTS

| | | | |
|---|---|---|---|
| 3,617,780 | 11/1971 | Benjaminson et al. .................. | 310/367 |
| 4,419,600 | 12/1983 | Sinha ...................................... | 310/361 |
| 4,457,691 | 7/1984 | Valdois et al. ........................... | 310/361 |
| 4,547,691 | 10/1985 | Valdois et al. ........................... | 310/361 |
| 4,562,375 | 12/1985 | Besson et al. ........................... | 310/338 |
| 4,586,382 | 5/1986 | Sinha ...................................... | 73/703 |
| 4,705,979 | 11/1987 | Sinha ...................................... | 310/313 |
| 5,221,873 | 6/1993 | Totty et al. .............................. | 310/361 |

OTHER PUBLICATIONS

Besson, R. J. et al. A Dual–Mode Thickness–Shear Quartz Pressure Sensor. *IEEE Transactions on Ultrasonics, Ferroelectrics, and Frequency Control.* vol. 40, No. 5. (Sep. 1993).

EerNisse, E.P. Theoretical Modeling of Quartz Resonator Pressure Transducers. *IEEE 41$^{st}$ Annual Frequency Control Symposium.* pp. 339–343, Dec. 1987.

Kusters, John A. The SC Cut Crystal—An Overview. *IEEE 1981 Ultrasonic Symposium.* pp. 402–409, Dec. 1981.

Veldois, Michel et al. Experimental Verification of Stress Compensation in the SBTC–Cut. *IEEE Transactions on Ultrasonics, Ferroelectrics, and Frequency Control.* vol. 36, No. 6. (Nov. 1989).

*Primary Examiner*—Thomas M. Dougherty
*Attorney, Agent, or Firm*—William B. Batzer; David P. Gordon

[57] ABSTRACT

A dual-mode thickness-shear quartz pressure transducer includes a unitary piezoelectric crystal resonator and cylindrical housing structure wherein the resonator is located on a median radial plane of the housing and the exterior of the housing is provided with a pair of parallel flat surfaces which are located at an angle relative to the X" axis of the resonator. According to the presently preferred embodiment, the transducer is made from an SC-cut or a WAD-cut solid quartz crystal cylinder which is ultrasonically milled to form a plano-convex or bi-convex resonator disk in the medial radial plane of a hollow cylinder and the pair of exterior flats. The wall thickness of the cylinder is altered at the location of the flats such that stresses at the center of the resonator disk are anisotropic. According to the invention, the ratio of the stresses at the center of the resonator disk along the X" and Z" axes are optimized such that the pressure sensitivity of the third thickness harmonic of C mode vibration is maximized. Optimization of the ratio of the stresses along the X" and Z" axes is accomplished in particular by altering the (azimuthal) angle of the flats. According to a presently preferred embodiment of the invention, the flats are located at an azimuthal angle of approximately 134° relative to the X" axis of a WAD-cut resonator.

20 Claims, 11 Drawing Sheets

DUAL-MODE THICKNESS-SHEAR QUARTZ PRESSURE SENSORS FOR HIGH PRESSURE AND HIGH TEMPERATURE APPLICATIONS

BACKGROUND OF THE INVENTION

1. Field of the Invention

The invention relates to dual-mode thickness-shear quartz pressure sensors. More particularly, the invention relates to dual-mode thickness-shear quartz pressure sensors having a disc as the sensing resonator and external flats for increased pressure sensitivity.

2. State of the Art

Quartz crystals exhibit a physical phenomenon called the piezoelectric effect. When a quartz crystal is subjected to alternate compressive and tensile strains, opposite electric charges are produced on different faces of the crystal. Conversely, when alternating electric charges are applied to opposite faces of the crystal, the crystal expands and contracts alternatingly. This property of quartz has been exploited to produce highly accurate oscillators for audio, video, and telecommunications electronics. Quartz crystals have also been used to produce very accurate clocks.

Quartz crystal resonators consist of a quartz plate mounted between two electrodes. Originally the quartz plates were made from natural quartz, but today cultured quartz is used almost exclusively. The plates (also called wafers or blanks) are fabricated at a precise orientation with respect to the crystallographic axes of the quartz material. This is most often achieved by growing a monolithic block of quartz and then cutting it. The orientation or "cut" of the plate determines frequency-temperature characteristics and other important properties of the resonator.

The quartz plate has many modes of vibration, such as flexure, longitudinal or thickness-extension, face-shear, and thickness-shear, each of which has numerous resonances. Properly oriented electrodes excite the desired mode of vibration. Except for the low-frequency tuning fork resonators used in quartz watches and clocks, most resonators use a thickness-shear mode of vibration. Thickness-shear resonators are classified as high-frequency resonators, while other types are classified as low-frequency resonators. The fundamental frequency of a thickness-shear resonator is inversely proportional to its thickness. There are additional resonances at the 3rd, 5th, etc. overtones, whose frequencies are approximate, but not exact, odd multiples of the fundamental resonance frequency. Resonators are ordinarily designed to optimize the characteristics of one or another of these resonances, such as the fundamental or the third overtone, but the other overtones necessarily still exist.

The resonant frequency of a thickness-shear quartz resonator changes when the ambient temperature or pressure changes. The effects of pressure and temperature on these resonators have been exhaustively studied with the objective of eliminating these effects on oscillators in frequency control applications. Knowledge of these effects has also been used to create piezoelectric transducers.

Figure 1:
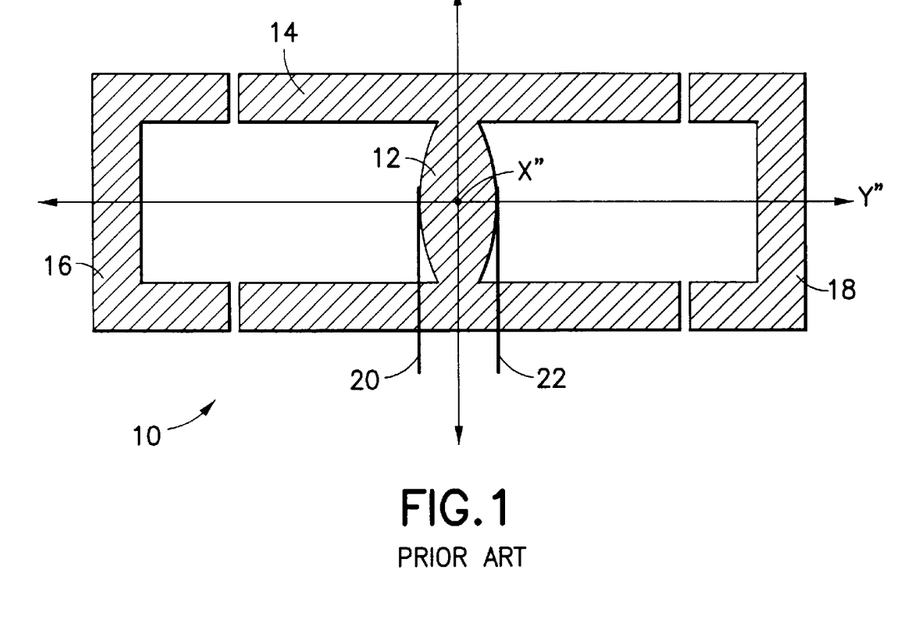
FIG. 1 is an exploded schematic sectional view of a prior art quartz pressure transducer.

Piezoelectric pressure and temperature transducers (sensors) have been known for many years. These transducers generally include a crystal blank inside a housing with electrodes placed on opposite sides of the blank. An alternating voltage is applied to the blank which causes it to vibrate at a resonant frequency. The resonant frequency at which the crystal vibrates changes when the crystal is subjected to stresses. Accordingly, changes in temperature and pressure on the housing produce detectible changes in the resonant frequency of the crystal. An exemplary piezoelectric transducer is disclosed in U.S. Pat. No. 3,617,780 to Benjaminson. A similar resonator is shown schematically in prior art FIG. 1. The transducer 10 includes a unitary piezoelectric crystal resonator 12 and cylindrical housing structure 14. The resonator 12 is located on a median radial plane of the housing 14 and crystal end caps 16, 18 are used to cover the open ends of the cylindrical housing 14. Electrodes 20, 22 are located on opposite faces of the resonator 12. The electrodes are typically formed by vacuum deposition of conductive material such as copper or preferably gold. FIG. 1 shows the end caps detached. Typically, the transducer 10 is assembled by gluing the end caps 16, 18 to the cylindrical housing 14 in a rarefied atmosphere leaving a vacuum inside the assembled structure. The transducer is sensitive to changes in temperature and pressure. However, in order to effectively measure either temperature or pressure, one must be held constant or must be known. Pressure sensors of this type are typically used in conjunction with a separate temperature sensor so that the pressure sensor signal can be adjusted to compensate for the effects of temperature on the pressure transducer. Piezoelectric transducers of this type are often referred to as "single mode transducers".

In a material such as piezoelectric quartz, measurable vibration of the resonator plate actually takes place according to three modes, namely, mode A (the quasi-longitudinal mode) and modes B and C (two quasi-transverse or thickness-shear modes). These three modes are distinguished by their frequencies, mode A being the fastest and mode C being the slowest. It is possible to favor some of these modes at the expense of others by suitable choice of the cut and dimensions of the resonator plate. The so-called "single mode" transducers are designed to favor one of the two thickness-shear modes.

Figure 2:
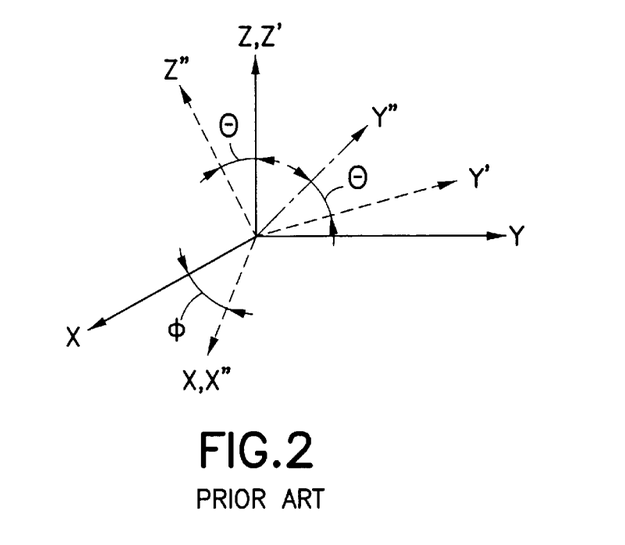
FIG. 2 is an illustration of the axes of rotation referenced in a crystal cut.

One popular solution to the disadvantages of the so-called "single mode transducers" is to provide a quartz resonator in which oscillation in both the B and C modes is favored. This is made possible by carefully selecting the precise orientation of the resonator blank with respect to the crystallographic axes of the quartz material. This orientation, known as the "cut", is described with reference to X, Y, and Z axes where X is the electrical axis, Y is the mechanical axis, and Z is the optical axis of the crystal. Prior art FIG. 2 illustrates these X, Y, and Z axes and a crystal cut defined by the axes X", Y", Z". According to this cut, the axes of the resonator are determined by a first angular displacement $\Phi$ about the X axis and a second angular displacement $\theta$ about the Z axis. As shown in FIG. 2, the first angular displacement results in the axes X', Y', Z' with the Z' axis being collinear with the Z axis. The second angular displacement results in the axes X", Y", Z" with the X" axis being collinear with the X' axis. This $\Phi$, $\theta$ angular displacement is typical of several popular cuts, including the "SC" (stress compensated) cut ($\Phi$=22.5°, $\theta$=34.3°) and the "WAD" (without activity dip) cut ($\Phi$=24°, $\theta$=33°).

Temperature induced frequency shifts in quartz resonators are significantly different for various harmonic and anharmonic overtones. The amplitude of vibration of a desired mode may be drastically reduced at some temperatures if a neighboring unwanted mode frequency gets close to the frequency of the desired mode. This phenomenon is known as "activity dip". The WAD cut is close to the SC cut but has no activity dips in the B-mode at higher temperatures.

Popular "singly rotated" cuts are also defined by $\Phi$ and $\theta$ but with $\Phi$=0°. These include the "AT" (A-mode temperature compensated) cut ($\Phi$=0°, $\theta$=35.25°) and the "BT"

(B-mode temperature compensated) cut ($\Phi=0°$, $\theta=-49.22°$). The singly rotated cuts result in single mode resonators whereas the doubly rotated cuts result in dual-mode resonators.

The advantage of a dual-mode transducer over a single mode transducer is that B-mode vibration is primarily only responsive to temperature whereas C-mode vibration is responsive to both temperature and pressure. Thus, by noting the change in frequency in both modes, one can solve for both temperature and pressure. Co-owned U.S. Pat. No. 4,419,600 to Sinha discloses dual-mode transducers which are capable of measuring pressure and temperature simultaneously.

Many advances in the science of quartz pressure/temperature transducers have been made in connection with hydrocarbon reservoir modeling. Transient or dynamic pressure measurements are routinely employed in the estimation of formation permeability, reservoir pressure, formation continuity, and reservoir boundaries. The pressures encountered during such modeling can be greater than 20,000 psi. While making measurements, the transducers can be subjected to temperatures of approximately 175° C. The state of the art transducers used in hydrocarbon reservoir modeling are only able to measure pressures up to about 18,000 psi.

SUMMARY OF THE INVENTION

It is therefore an object of the invention to provide a pressure sensor which is suitable for use in high pressure and high temperature environments.

It is also an object of the invention to provide a dual-mode thickness-shear quartz pressure transducer which is suitable for use in high pressure and high temperature environments.

It is another object of the invention to provide a dual-mode thickness-shear quartz pressure transducer which is capable of measuring very high pressures.

It is still another object of the invention to provide a dual-mode thickness-shear quartz pressure transducer which is capable of measuring high pressures with high resolution.

In accord with these objects which will be discussed in detail below, the dual-mode thickness-shear quartz pressure transducer of the present invention includes a unitary piezoelectric crystal resonator and cylindrical housing structure wherein the resonator is located on a median radial plane of the housing and the exterior of the housing is provided with a pair of parallel flat surfaces which are located at an angle relative to the X" axis of the resonator. According to the presently preferred embodiment, the transducer is made from an SC-cut or, more preferably a WAD-cut solid quartz crystal cylinder which is ultrasonically milled to form a plano-convex or, more preferably a bi-convex resonator disk in the medial radial plane of a hollow cylinder and the pair of exterior flats. The wall thickness of the cylinder is altered at the location of the flats such that stresses at the center of the resonator disk are anisotropic. According to the invention, the ratio of the stresses at the center of the resonator disk along the X" and Z" axes are optimized such that the pressure sensitivity of the third thickness harmonic of C-mode vibration is maximized. Optimization of the ratio of the stresses along the X" and Z" axes is accomplished in particular by altering the (azimuthal) angle of the flats. According to a presently preferred embodiment of the invention, the flats are located at an azimuthal angle of approximately 134° relative to the X" axis of a WAD-cut resonator. Additional objects and advantages of the invention will become apparent to those skilled in the art upon reference to the detailed description taken in conjunction with the provided figures.

DETAILED DESCRIPTION OF THE PREFERRED EMBODIMENTS

Figure 3:
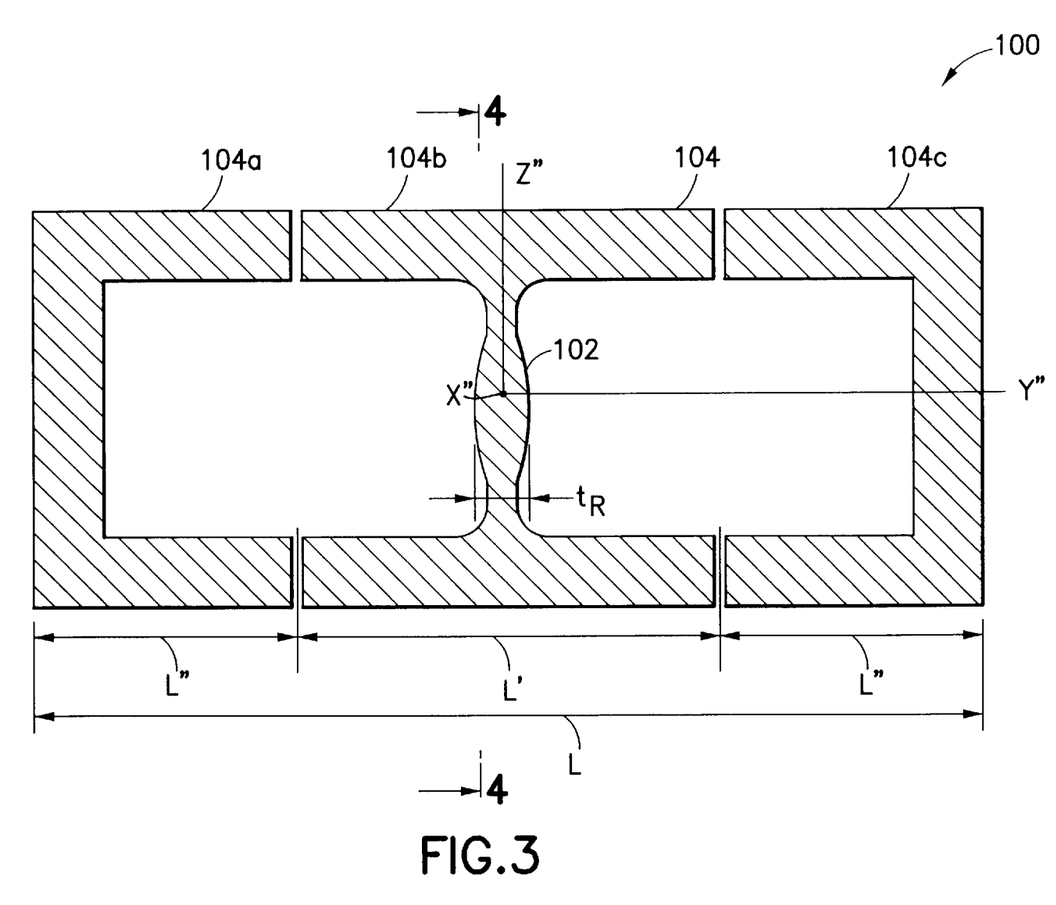
FIG. 3 is an exploded schematic sectional view of a quartz pressure transducer according to the invention.
Figure 4:
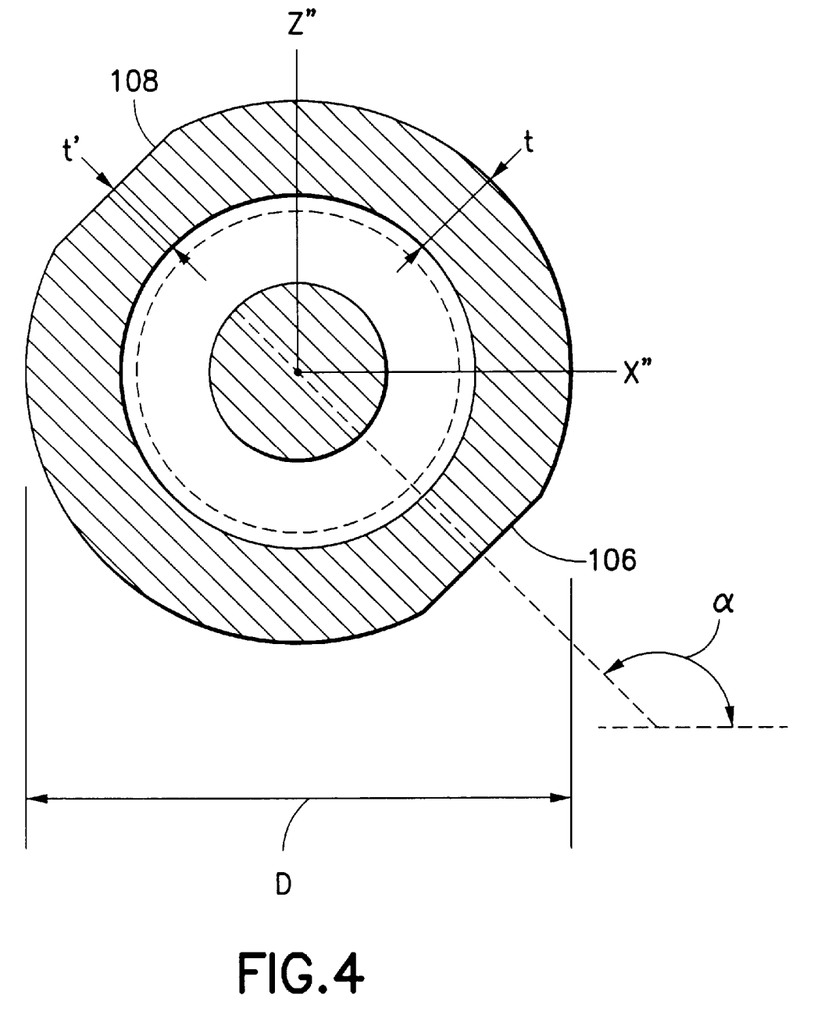
FIG. 4 is a section taken along line 4—4 in FIG. 3.

Referring now to FIGS. 3 and 4, the dual-mode thickness-shear quartz pressure transducer 100 of the present invention includes a unitary piezoelectric crystal resonator 102 and cylindrical housing structure 104 wherein the resonator 102 is located on a median radial plane of the housing and the exterior of the housing is provided with a pair of parallel flat surfaces 106, 108 which are located at an angle $\alpha$ relative to the X" axis of the resonator.

According to a first embodiment, the transducer is made from a WAD-cut solid quartz crystal cylinder having an outer diameter D which is approximately 22 mm, and an overall length L which is approximately 60 mm. The cylinder is cut into three pieces 104a, 104b, 104c, the middle piece 104b having a length L' of approximately 30 mm and the two end pieces each having a length L" of approximately 15 mm. The middle piece 104b of the cylinder is ultrasonically milled to form the centrally located bi-convex resonator disk 102 having a thickness of $t_R$ of approximately 1.5 mm. The end pieces 104a, 104c are milled to form end caps which are ultimately glued to the middle piece 104b to form the housing structure 104 with vacuum on either side of the resonator 102. Electrodes (not shown) are attached to the resonator 102 in a conventional manner. The electrodes are generally attached by vacuum evaporation onto a heated crystal surface. Gold electrodes having a thickness of about 1,000–1,500 angstroms are preferred for good long term stability. To achieve a better bonding of the gold film onto the quartz surface, a chrome interface of about 60 angstroms thickness is deposited before gold deposition. After the end caps are attached, the flats 106, 108 are ultrasonically milled. According to the first embodiment, the flats are perpendicular to a diametrical line which forms an angle of approximately 134° with the X" axis of the crystal.

The wall thickness t of the cylinder is reduced to t' at the location of the flats such that stresses at the center of the resonator disk are anisotropic. According to the invention, the ratio of the stresses at the center of the resonator disk along the X" and Z" axes are optimized such that the pressure sensitivity of the third thickness harmonic of o=C mode vibration is maximized. Optimization of the ratio of the stresses along the X" and Z" axes is accomplished in particular by altering the (azimuthal) angle of the flats.

According to a presently preferred embodiment of the invention, the flats are located at an azimuthal angle of approximately 134° relative to the X" axis of a WAD-cut resonator.

Figure 5:
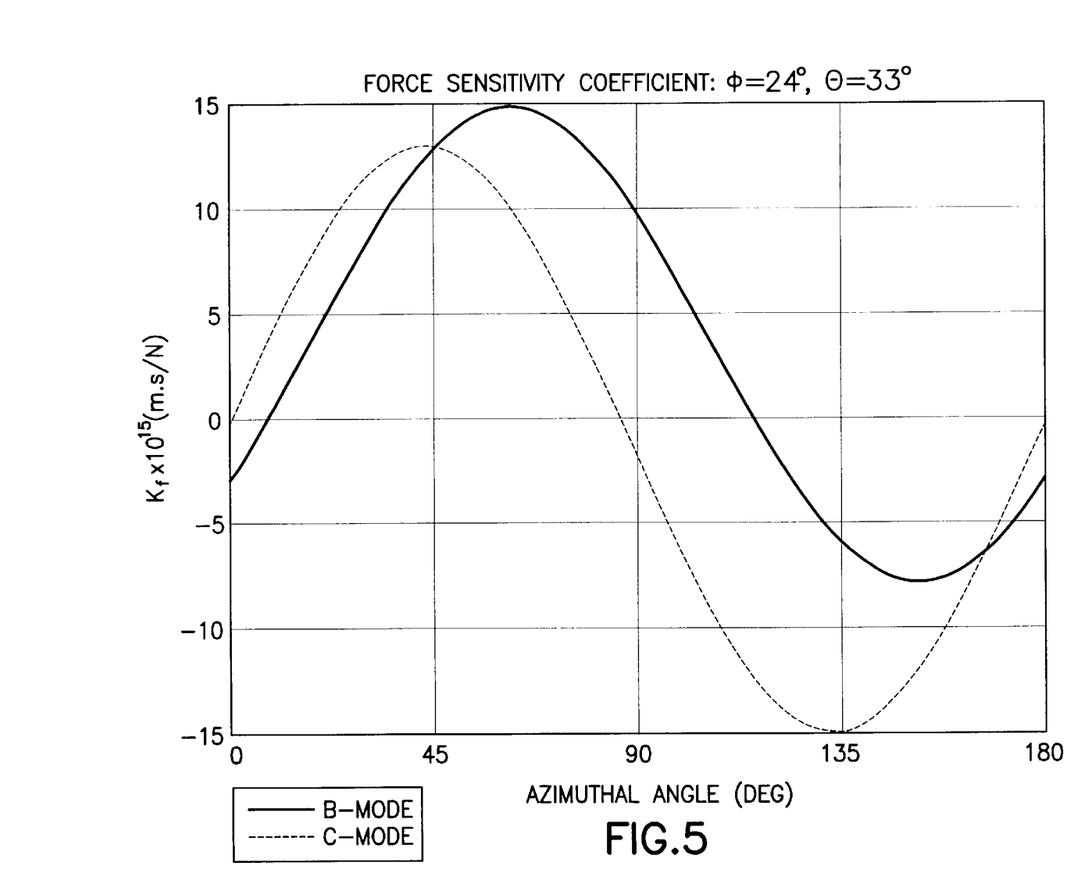
FIG. 5 is a graph of force-frequency coefficients for B and C modes of vibration in a WAD-cut resonator.

FIG. 5 illustrates the force-sensitivity coefficient $K_f$ for a WAD cut resonator in both the B mode and the C mode. The force-frequency coefficient for either the B or C mode of vibration for any crystalline orientation of quartz is given by equation (1) below where •f/f is the fractional change in the resonant frequency, $N=t_R f_O$ (the product of the fundamental frequency $f_O$ of the resonator and its thickness $t_R$ at its center, also known as the frequency constant, expressed in m/s), D is the disc diameter in meters, and F is the magnitude of a pair of diametrical forces in Newtons which are applied to the disc at a particular azimuthal angle.

$$K_f = \frac{\Delta f}{f} t_R \frac{D}{FN} \qquad (1)$$

The mean force sensitivity coefficient $K_f^M$ can be obtained by integrating the force-frequency coefficient over the periphery of the resonator disc as given by the integral of equation (2) below.

$$K_f^M = \frac{1}{\pi} \int_0^\pi K_f(\alpha) d\alpha \qquad (2)$$

Figure 6:
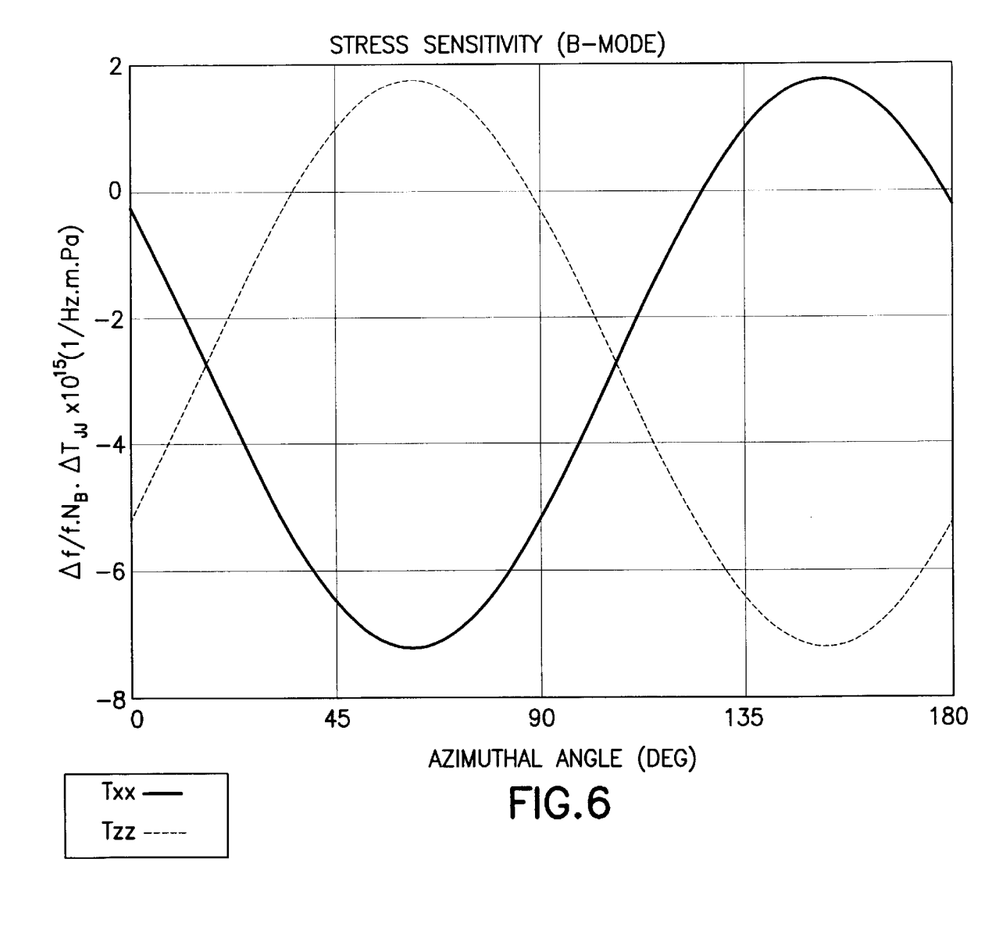
FIG. 6 is a graph of stress sensitivity curves for the B mode of vibration in a WAD-cut resonator.

FIGS. 6 illustrates the stress sensitivity coefficients ($D_X^B$ and $D_Z^B$) plotted as a function of azimuthal angle for the B-mode of vibration. These stress sensitivity coefficients are related to the fractional change in resonant frequency as illustrated in equation (3) below where $T_{XX}$ and $T_{ZZ}$ are the normal stresses at the center of the resonator disk and $N_B$ is the frequency constant for the B-mode of vibration.

$$\frac{\Delta f}{f} = (D_X^B T_{XX} + D_Z^B T_{ZZ})N_B \qquad (3)$$

The stresses $T_{XX}$ and $T_{ZZ}$ are related to the diameter D of the disk and the thickness $t_R$ at the center of the disk as expressed in equations (4) and (5) below where F represents a pair of diametrical forces applied to the disk at a particular azimuthal angle.

$$T_{xx} = -\frac{6}{\pi} \frac{F}{t_R D} \qquad (4)$$

$$T_{zz} = \frac{2}{\pi} \frac{F}{t_R D} \qquad (5)$$

Given the above equations, the stress sensitivity coefficients ($D_X^B$ and $D_Z^B$) can be calculated from the azimuthal variation of the force-frequency $K_f$ as shown in equations (6) and (7) below where $K_f^B(\alpha)$ and $K_f^B(\alpha+90°)$ are force-frequency coefficients for the B-mode of vibration at azimuthal angles $\alpha$ and $\alpha+90°$ respectively.

$$D_X^B = -\frac{\pi}{16}[3K_f^B(\alpha) + K_f^B(\alpha + 90°)] \qquad (6)$$

$$D_Z^B = -\frac{\pi}{16}[K_f^B(\alpha) + 3K_f^B(\alpha + 90°)] \qquad (7)$$

Figure 7:
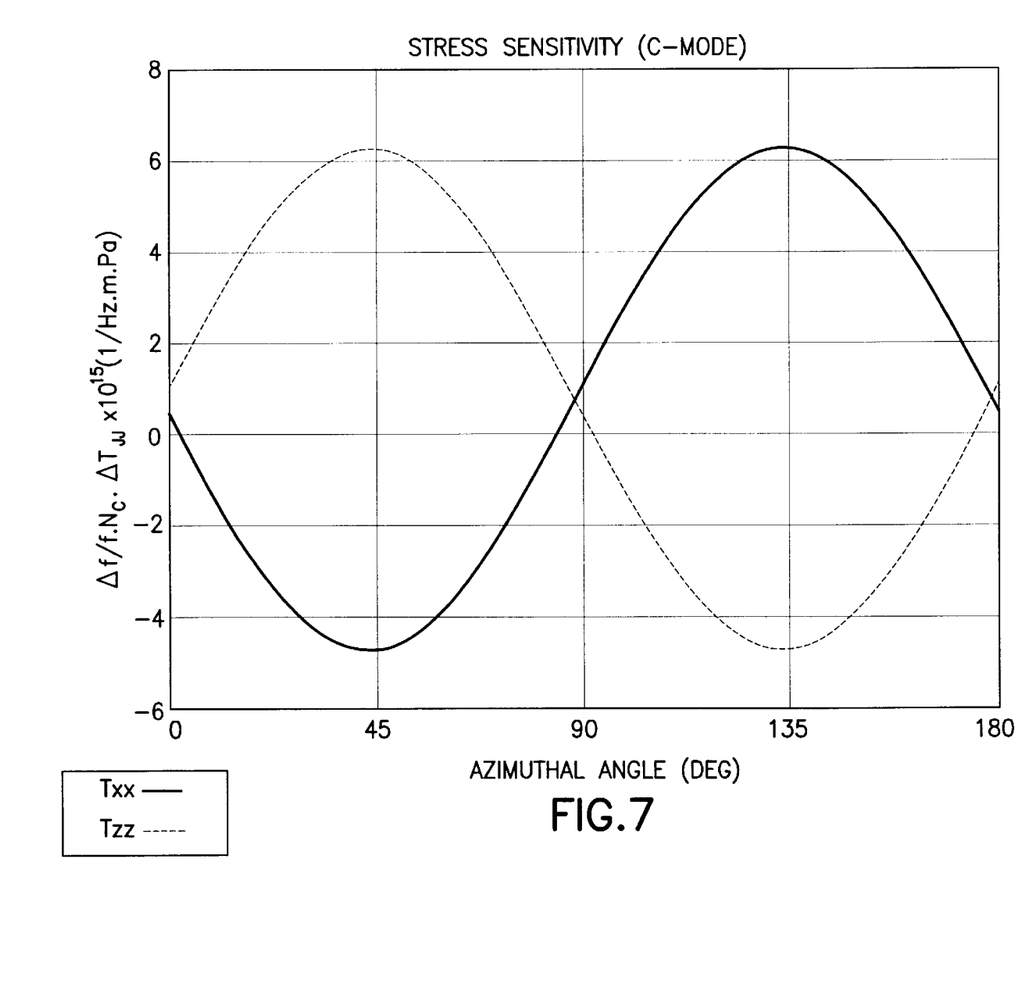
FIG. 7 is a graph of stress sensitivity curves for the C mode of vibration in a WAD-cut resonator.

FIGS. 7 illustrates the stress sensitivity coefficients (and) plotted as a function of azimuthal angle for the C-mode of vibration. These stress sensitivity coefficients are related to the fractional change in resonant frequency as illustrated in equation (8) below where $T_{XX}$ and $T_{ZZ}$ are the normal stresses at the center of the resonator disk and $N_C$ is the frequency constant for the C-mode of vibration.

$$\frac{\Delta f}{f} = (D_X^C T_{XX} + D_Z^C T_{ZZ})N_C \qquad (8)$$

As mentioned above, the stresses $T_{XX}$ and $T_{ZZ}$ are related to the diameter D of the disk and the thickness $t_R$ at the center of the disk as expressed in equations (4) and (5) above.

The stress sensitivity coefficients ($D_X^C$ and $D_Z^C$) can be calculated from the azimuthal variation of the force-frequency $K_f$ as shown in equations (9) and (10) below where $K_f^C(\alpha)$ and $K_f^C(\alpha+90°)$ are force-frequency coefficients for the C-mode of vibration at azimuthal angles $\alpha$ and $\alpha+90°$ respectively.

$$D_X^C = -\frac{\pi}{16}[3K_f^C(\alpha) + K_f^C(\alpha + 90°)] \qquad (9)$$

$$D_Z^C = -\frac{\pi}{16}[K_f^C(\alpha) + 3K_f^C(\alpha + 90°)] \qquad (10)$$

If the normal stresses at the center of the resonator disc are caused by an external hydrostatic pressure of 1 kbar (i.e., 14700 psi), the pressure sensitivity for B-mode and C-mode vibrations can be calculated according to the equation (11) below where •f/f is calculated according to equation (3) for B-mode vibrations and according to equation (8) for C-mode vibrations.

$$\frac{\Delta f}{\Delta P} = \frac{\Delta f}{f}\left(\frac{f}{14700}\right) \qquad (11)$$

Figure 8:
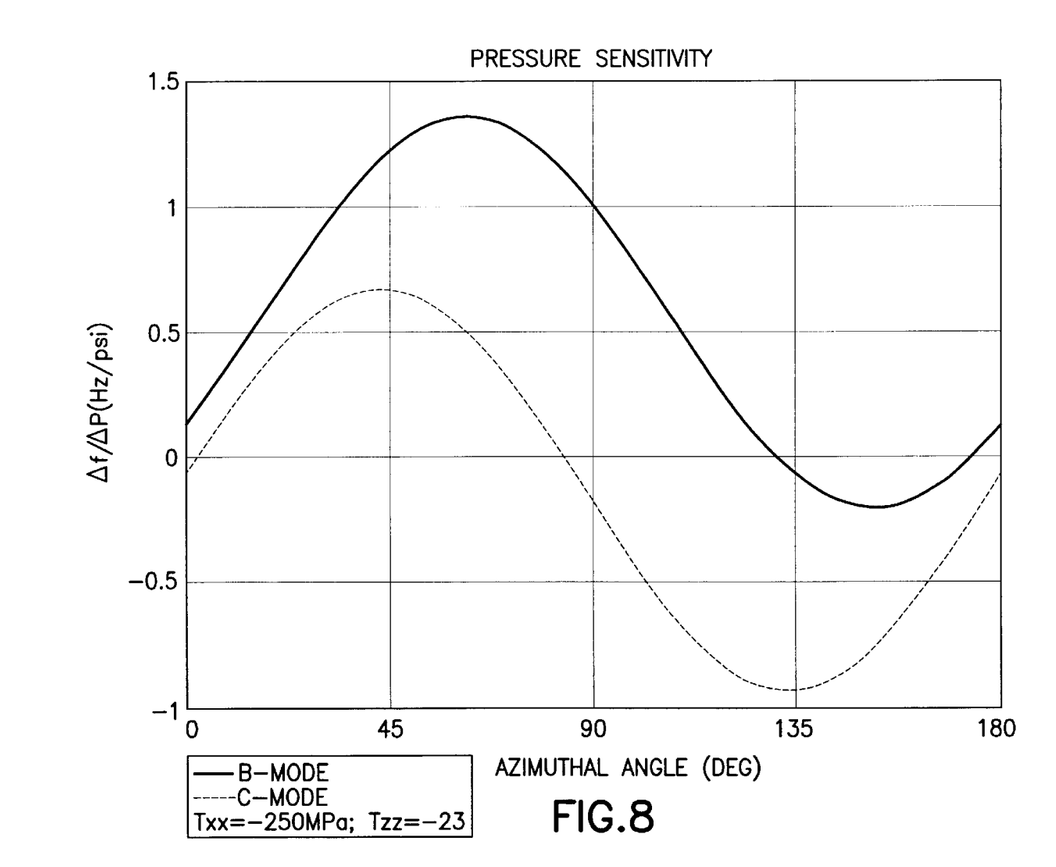
FIG. 8 is a graph of pressure sensitivity for B and C modes of vibration in a WAD-cut resonator.
Figure 9:
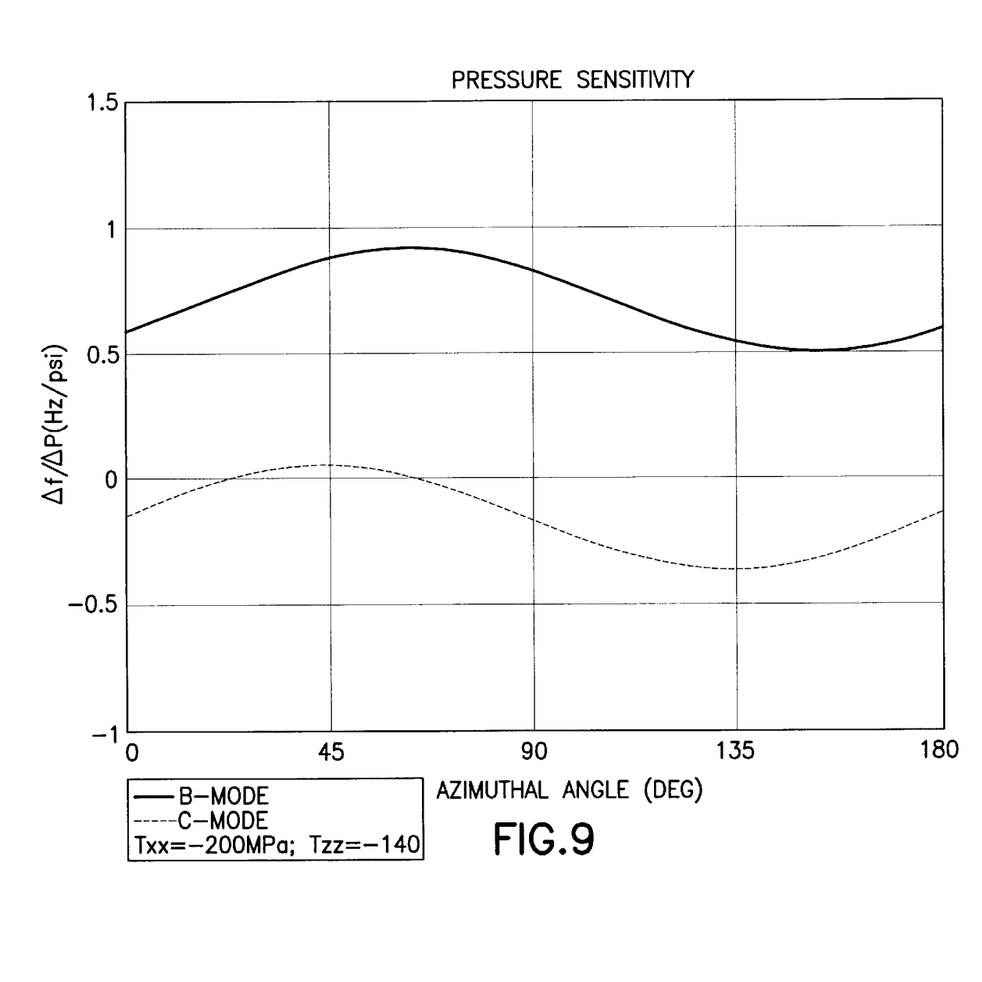
FIGS. 9–12 are graphs of pressure sensitivity for B and C modes of vibration in a pressure transducer according to the invention.
Figure 10:
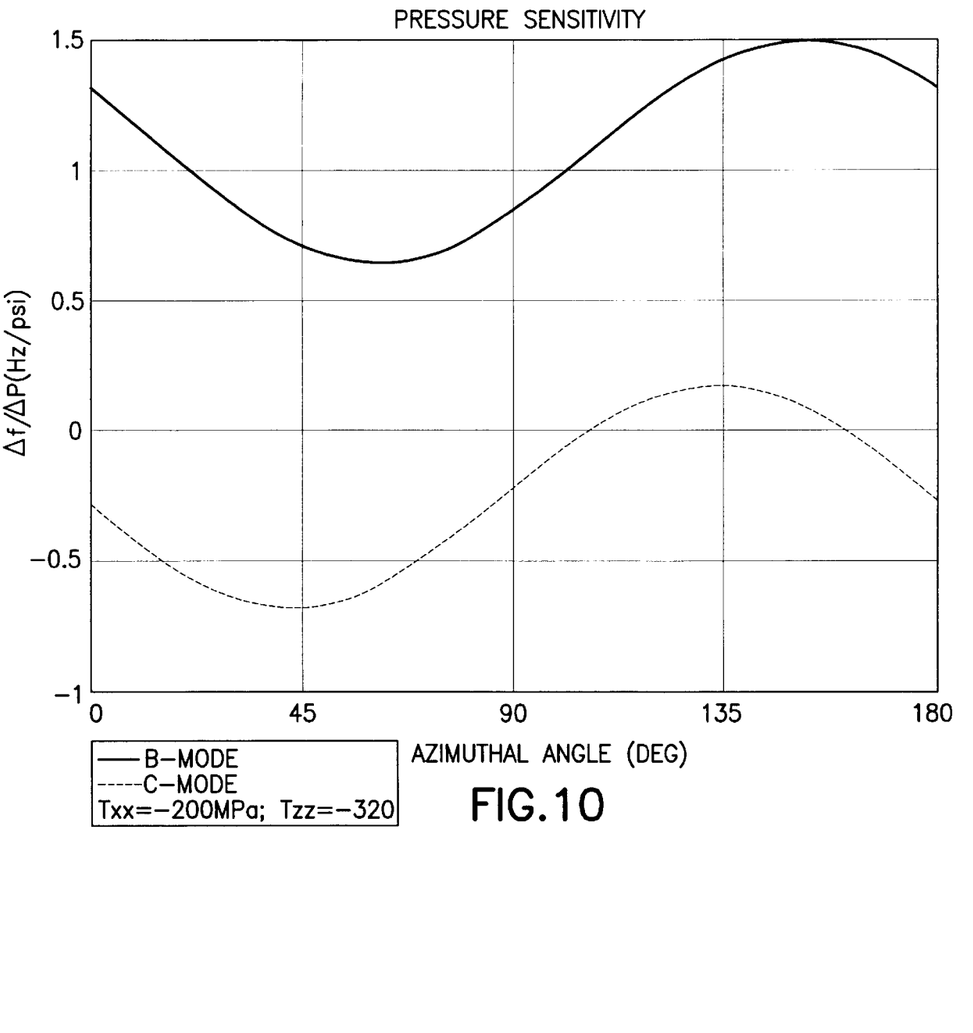
Figure 11:
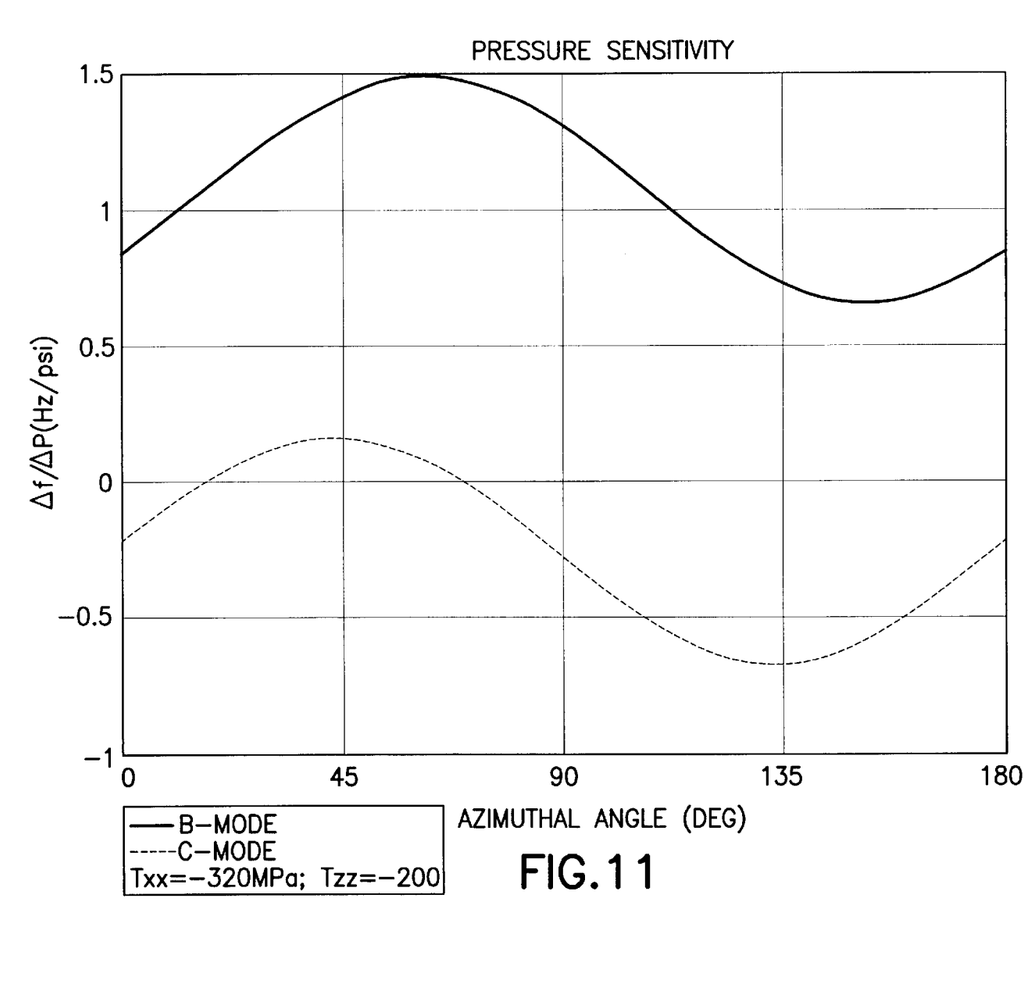
Figure 12:
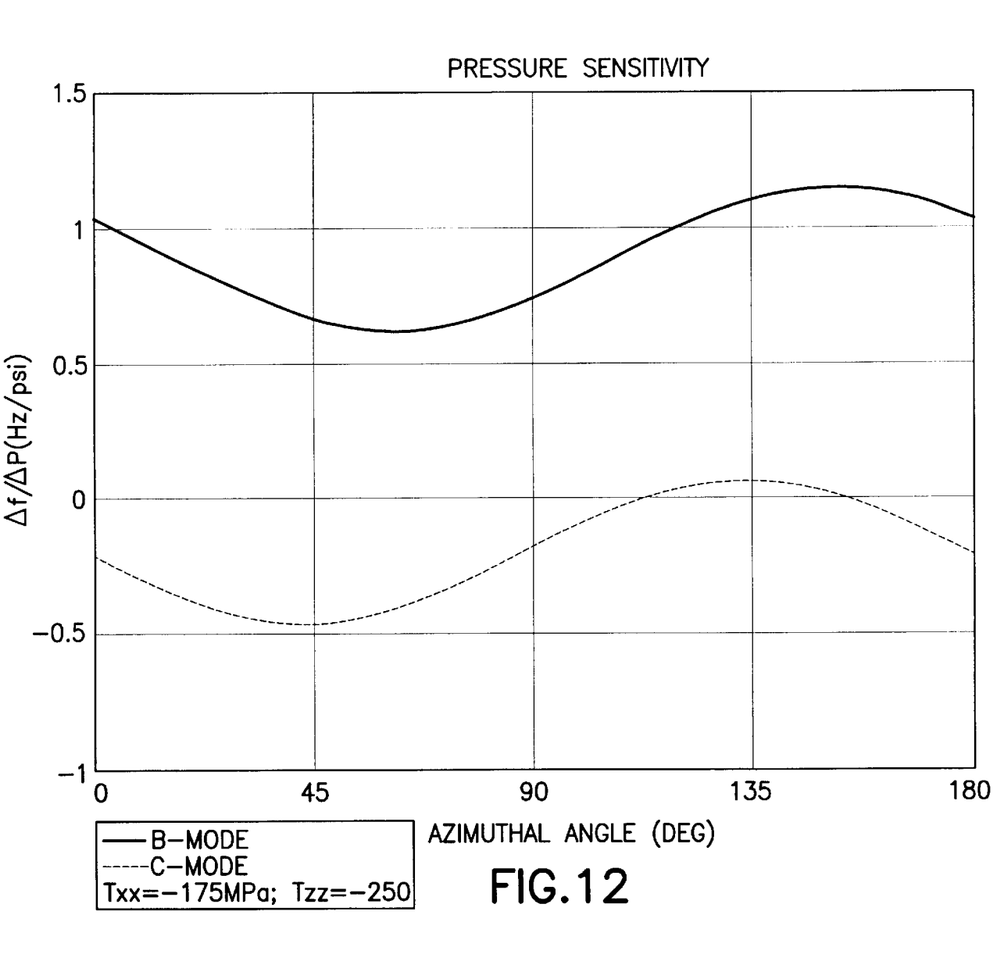

FIG. 8 illustrates the results of experimental 3D finite-element stress analysis of a particular embodiment of the resonator (which results in $T_{XX}$=−250 Mpa and $T_{ZZ}$=−23 Mpa) showing the pressure sensitivity of a resonator as a function of azimuthal angle under an external hydrostatic pressure of 1 kbar. This particular embodiment has a very low magnitude of $T_{ZZ}$ realized by cutting a slit perpendicular to the Z"-axis at the periphery of the resonator disc. These results, as well as the calculations described above, suggested to the inventors that the azimuthal angle of approximately 134° would result in a B-mode vibration which is virtually insensitive to pressure and a C-mode vibration which is extremely sensitive to pressure. In particular, the pressure sensitivities of different disc resonators were calculated according to the equations discussed above for several different resonators, all having a WAD-cut. Different probe geometries and flat thicknesses produce different values of $T_{XX}$ and $T_{ZZ}$ at the center of the resonator disc. The results of those calculations are summarized in Table 1 below and graphically represented in FIGS. 9–12.

TABLE 1

| Flats Location | $T_{xx}$ | $T_{zz}$ | $\frac{\Delta f}{\Delta P}(B)$ | $\frac{\Delta f}{\Delta P}(C)$ | Figure |
|---|---|---|---|---|---|
| α | MPa | MPa | Hz/psi | Hz/psi | |
| 134° | −250 | −23 | 0 | −0.8 | 8 |
| 135° | −200 | −140 | −0.35 | 0.5 | 9 |
| 45° | −200 | −320 | −0.65 | 0.7 | 10 |
| 135° | −320 | −200 | −0.65 | 0.7 | 11 |
| 45° | −175 | −250 | −0.5 | 0.6 | 12 |

As explained above, the magnitude of $T_{XX}$ and $T_{ZZ}$ are related to the dimensions of the resonator probe as well as the location of the flats proposed by the invention. In particular, these stresses are dependent on the cylindrical shell thickness t (see FIGS. 3 and 4), the flat thickness t', and the thickness $t_R$ of the resonator. The outer diameter D and the length L of the cylindrical probe also influence the magnitude of $T_{XX}$ and $T_{ZZ}$.

In accord with the primary object of the invention, a second transducer according to the invention was made wherein the pressure sensitivity of C-mode vibration was also enhanced. The second transducer is a cylindrical probe having an outer diameter D of 12 mm and a wall thickness t of 3 mm. A fillet of 1 mm radius is provided at the boundary between the resonator disc and the and the cylindrical shell. The diameter of the resonator disc is therefore 4 mm. The thickness $t_R$ of the resonator disc is 1.06 mm. In addition, the radius of curvature of the convex faces of the resonator disc is 260 mm. The length L' of the cylindrical housing structure is 4 mm and the length L" of the end caps is also 4 mm. The second embodiment is provided with a pair of external flats at an azimuth angle of 135°. Each flat has a depth of 2 mm. The second embodiment was subjected to three-dimensional stress analysis for an assumed temperature of 20,000 psi. The results of the analysis are summarized in Table 2.

TABLE 2

| Flat Location | $T_{xx}$ | $T_{zz}$ | $\frac{\Delta f}{\Delta P}(B)$ | $\frac{\Delta f}{\Delta P}(C)$ |
|---|---|---|---|---|
| α | MPa | MPa | Hz/psi | Hz/psi |
| 135° | −347 | −252 | 0.6 | −0.5 |

Both the first and second transducers are capable of measuring very high pressures, e.g. 22,000 psi. The first transducer provides a better resolution (sensitivity) than the second transducer and also provides an absolute temperature measurement via the B-mode vibration which has no sensitivity to pressure. Nevertheless, the resolution provided by the second transducer is still adequate and temperature compensation can be made through extensive calibration techniques which are well known in the art. The pressure resolution of the second transducer is approximately 0.1 ppm/psi in both B-mode and C-mode. The temperature sensitivities of the B-mode and C-mode vibrations are approximately 28 ppm/°C. and approximately 3 ppm/°C., respectively.

As described above, the pressure sensitivity of the C-mode vibrations is a function of several variables, only one of which is the azimuthal angle of the flat(s) location. Almost equally important is the thickness t' of the transducer at the flat(s) and the thickness t of the transducer wall apart from the flat(s). In general, the thickness t' is made as small as possible while remaining strong enough to withstand the highest pressure being measured. The thickness t is made as large as possible without reducing the overall sensitivity of the transducer. From the foregoing, those skilled in the art will appreciate that experimental 3D finite-element stress analysis will reveal other embodiments which accomplish the goals of the present invention.

There have been described and illustrated herein several embodiments of a dual-mode thickness-shear quartz pressure sensor for high pressure and high temperature applications. While particular embodiments of the invention have been described, it is not intended that the invention be limited thereto, as it is intended that the invention be as broad in scope as the art will allow and that the specification be read likewise. For example, while it is preferable to provide two diametrically opposed flats, it is possible to achieve some of the benefits of the invention with a single flat. A single flat will provide a level of anisotropy but will not be able to withstand the maximum pressure that two flats will. It will therefore be appreciated by those skilled in the art that yet other modifications could be made to the provided invention without deviating from its spirit and scope as so claimed.

What is claimed is:

1. A dual-mode thickness-shear quartz pressure transducer, comprising:

a unitary piezoelectric crystal resonator and cylindrical housing structure, said housing structure having an exterior surface and a median radial plane, said resonator being located substantially on said median radial plane, and said exterior of said housing being provided with at least one flat surface.

2. A pressure transducer according to claim 1, wherein:
   said resonator is an SC-cut crystal.

3. A pressure transducer according to claim 1, wherein:
   said resonator is a WAD-cut crystal.

4. A pressure transducer according to claim 1, wherein:
   said at least one flat surface is located approximately 134° from the X" axis of said resonator.

5. A pressure transducer according to claim 1, wherein:
   said at least one flat surface is a pair of diametrically opposed flat surfaces.

6. A pressure transducer according to claim 5, wherein:
   one of said pair of diametrically opposed flat surfaces is located approximately 134° from the X" axis of said resonator.

7. A pressure transducer according to claim 1, wherein:
   said cylindrical housing structure has a wall thickness t which is reduced to t' by said at least one flat surface.

8. A pressure transducer according to claim 7, wherein:
   t is approximately 3 mm and t' is approximately 1 mm.

9. A pressure transducer according to claim 8, wherein:
   said cylindrical housing structure has an outer diameter of approximately 12 mm.

10. A pressure transducer according to claim 9, wherein:
    said transducer has an overall length of approximately 12 mm.

11. A pressure transducer according to claim 10, wherein:
    said at least one flat surface is located approximately 135° from the X" axis of said resonator.

12. A pressure transducer according to claim 11, wherein:
    said resonator has a diameter of approximately 4 mm and a maximum thickness of approximately 1.06 mm.

13. A pressure transducer according to claim 6, wherein:
said cylindrical housing structure has an outer diameter of approximately 22 mm.

14. A pressure transducer according to claim 13, wherein:
said transducer has an overall length of approximately 60 mm.

15. A pressure transducer according to claim 14, wherein:
said resonator has a diameter of approximately 4 mm and a maximum thickness of approximately 1.06 mm.

16. A pressure transducer according to claim 1, wherein:
said transducer has a C-mode vibration sensitivity to pressure of at least 0.5 Hz/psi.

17. A pressure transducer according to claim 16, wherein:
said transducer has a C-mode vibration sensitivity to pressure of approximately 0.8 Hz/psi.

18. A pressure transducer according to claim 1, wherein:
the frequency of B-mode vibration is substantially insensitive to pressure.

19. A pressure transducer according to claim 1, wherein:
said resonator is biconvex.

20. A pressure transducer according to claim 1, wherein:
said resonator is plano-convex.

* * * * *